Dec. 30, 1952 W. F. DOUBLE 2,623,602
RESILIENT MOUNTING OF VEHICLE CAB AND POWER UNIT
Filed June 5, 1947 3 Sheets-Sheet 1

INVENTOR
WALTER F. DOUBLE
BY Hyde, Meyer, Baldwin & Doran
ATTORNEYS

Dec. 30, 1952     W. F. DOUBLE     2,623,602
RESILIENT MOUNTING OF VEHICLE CAB AND POWER UNIT
Filed June 5, 1947     3 Sheets-Sheet 2

INVENTOR
WALTER F. DOUBLE
BY Hyde, Meyer, Baldwin & Doran
ATTORNEYS

INVENTOR
WALTER F. DOUBLE

BY Hyde, Meyer, Baldwin & Doran
ATTORNEYS

Patented Dec. 30, 1952

2,623,602

UNITED STATES PATENT OFFICE 2,623,602

RESILIENT MOUNTING OF VEHICLE CAB AND POWER UNIT

Walter F. Double, Wickliffe, Ohio, assignor to The Euclid Road Machinery Company, Cleveland, Ohio, a corporation of Ohio Application June 5, 1947, Serial No. 752,626

4 Claims. (Cl. 180—12)

1

This invention relates to off-the-road vehicles, such as are used in moving earth or other materials.

The object of this invention is to provide an improved truck embodying a power unit including cab and engine and transmission mounted upon a main frame movable with the front axle, and a load-carrying unit including the dump body and a chassis mounted upon the rear axle, the two units being coupled by a trunnion joint permitting relative motion between them, thus avoiding torsional strains or stresses when traveling over rough terrain. The cab and engine and transmission are mounted as a unit on a subframe resiliently supported upon the main frame and confined in such a manner, by links as described, as to prevent or avoid side or fore-and-aft sway or relative horizontal motion between the sub-frame and the main frame.

Further objects of the invention in part are obvious and in part will appear more in detail hereinafter.

In the drawings, which illustrate one suitable embodiment of the invention, Fig. 1 is a side elevation, the dot-dash lines illustrating the body in ordinary dumping position and the dotted lines in extreme dumping position;

Figure 1:
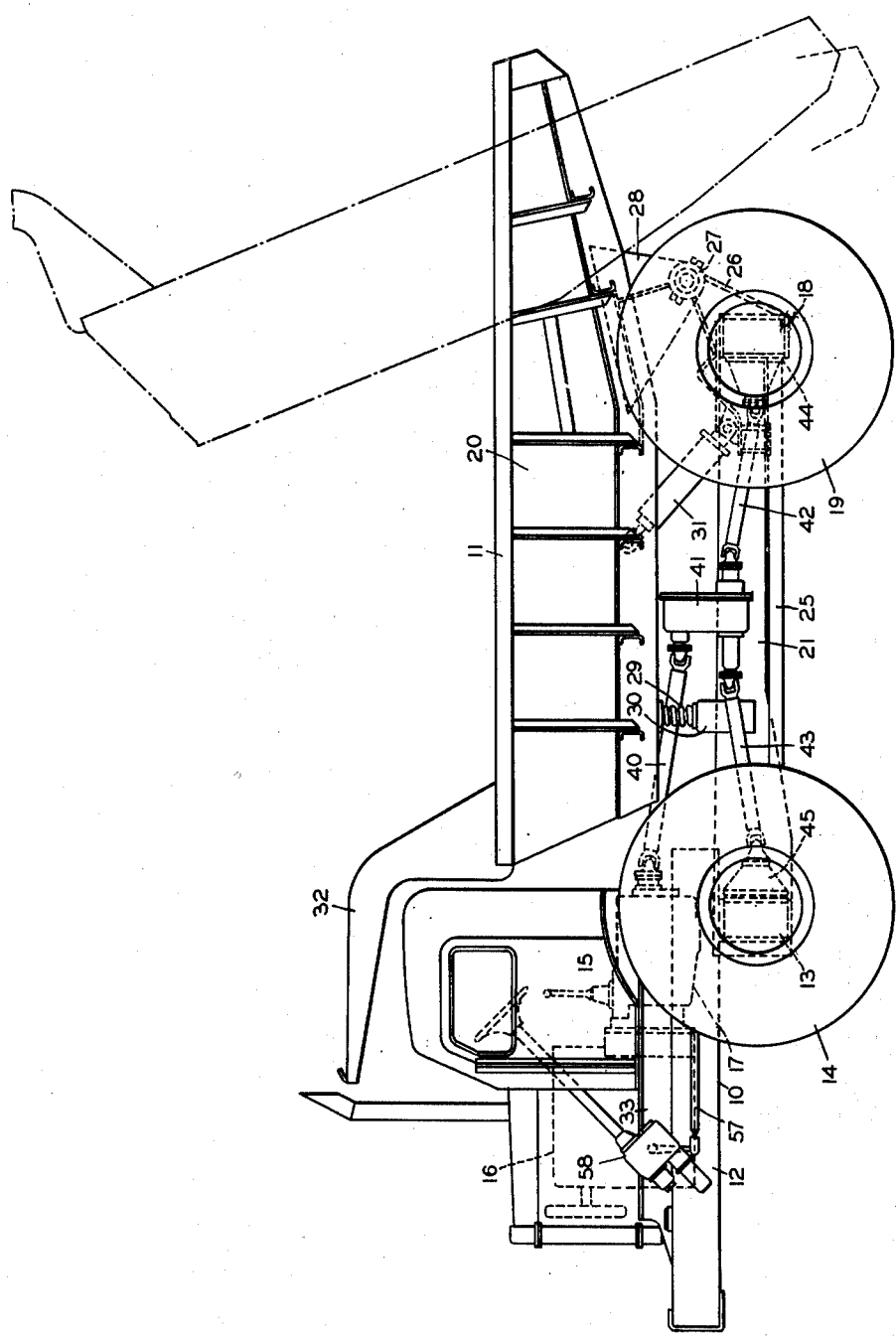

Referring first to Fig. 1, the dump truck shown in the drawings consists of the two units before referred to, to wit, a power unit marked generally 10 and a load-carrying unit marked generally 11 connected together in such manner as to provide relative motion between them so that the four wheels are self-accommodating to rough terrain without production of torsional strains or stresses. The power unit includes a hollow rectangular frame 12, made of structural steel members rigidly connected together and mounted upon the housing 13 for the front or steering axle provided with front wheels 14. On this frame are supported the usual cab 15, a power motor, such as the usual internal combustion engine 16, and conventional change speed mechanism indicated in dotted lines at 17. The load-carrying unit includes a supporting frame, later described in detail, supported upon the housing 18 of the rear axle provided with wheels 19, the frame of

2 this member being provided with a load-carrying body 20. The load-carrying unit will be described first.

Figures 2, 3:
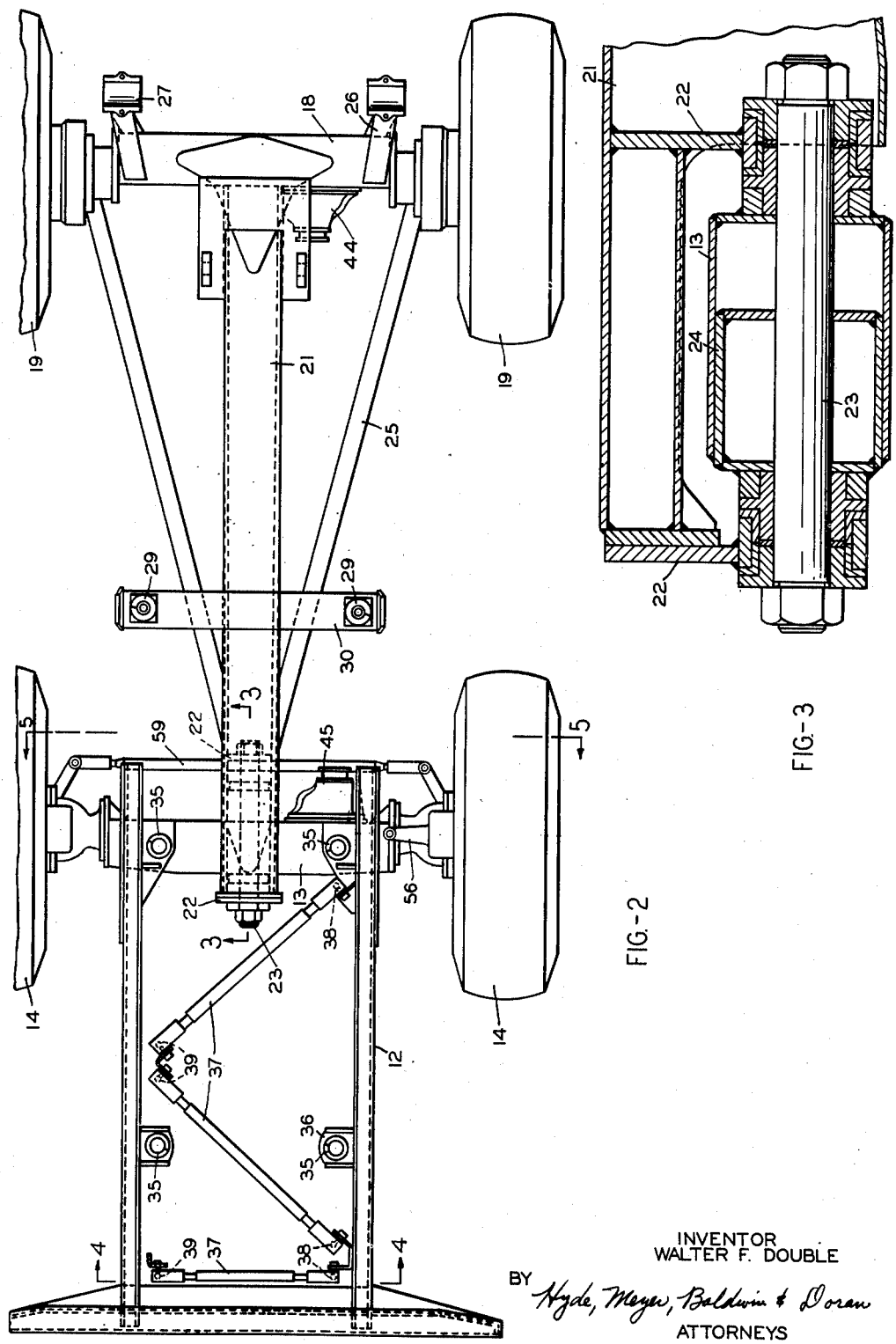
Fig. 2 is a plan view, the load-carrying body being omitted.
Fig. 3 is a sectional elevation on the line 3—3, Fig. 2.

The frame of this unit is in the form of a reach rod or member 21, shown as a hollow tubular member, made of structural steel shapes rigidly connected together, said reach member being rigidly secured at its rear end, as by welding, to the housing 18. At its front end said member is provided with depending ears 22 (Fig. 3) spaced apart and lying in parallel planes and journalled in any suitable manner to turn about a longitudinal axis on the shaft 23, which is mounted in a boxlike portion 24 of or attached to the front axle housing. Diagonal braces 25 contribute strength and rigidity to the frame. On brackets 26 integral with or welded to the rear axle housing 18 are mounted sleeves 27 to receive pivot pins supporting the load-carrying body 20 by means of depending body brackets 28. The body is of the usual shallow tray form with its floor partly horizontal and partly inclined, and surrounded by side and end walls forming a container in which dirt to be moved may be deposited. This body normally occupies the position shown in full lines, Fig. 1, its forward end resting upon and supported by compression springs 29 mounted upon the ends of a cross beam 30. For dumping a load it may be tilted to or toward the regular dumping position shown in dot-dash lines, Fig. 1, for which purpose suitable jack devices may be provided, such as one or two (one on each side) fluid pressure servomotors 31, preferably double-acting and actuated by fluid pressure, either air or oil, from any suitable source of pressure, such as a reservoir supplied by a pump (not shown) in the usual manner.

Under certain conditions the truck may be employed as a bulldozer for distributing a pile of earth or other material over an area. The truck is suitable for that purpose because, as will later appear, it embodies four wheel drive, and the body may be tilted to an extreme dumping position, shown in dotted lines, Fig. 1, with the extreme rear end of the body close to the ground level, say within the range of two or three inches therefrom. For bulldozer use, the jack 31 should be oil-operated and double-acting, to positively lock or hold the body in the bulldozing position.

By operating the truck in reverse gear the tilted body serves as a ram by means of which a pile of earth may be spread or distributed. During such action the side walls of the body prevent lateral spread of the earth so that it forms a reservoir or container in which the earth piles up as the ram body is shoved across the pile, thus assisting in distribution of the earth over a considerable range. The shock or strain of bulldozing operations is directly transmitted to the rear axle and through the frame reach bar 21 to the front axle at a relatively low level, usually below the top of a pile, so that bulldozing operations properly distribute the strains and stresses without undue torsional or bending effects. Further, the pivotal or rocking mounting of the forward end of the reach bar on the front axle permits the load-carrying unit, as a whole, to tilt or turn to one side or the other about the longitudinal axis of shaft 23, or the power unit to so tilt with reference to the load-carrying unit, enabling the truck as a whole to readily accommodate itself to inequalities or unevenness on rough terrain without the production of torsional strain or stresses.

The body 20 may be provided with a canopy 32 extending over and protecting the cab when the body is in horizontal or loading position, although this is not essential.

Figure 4:
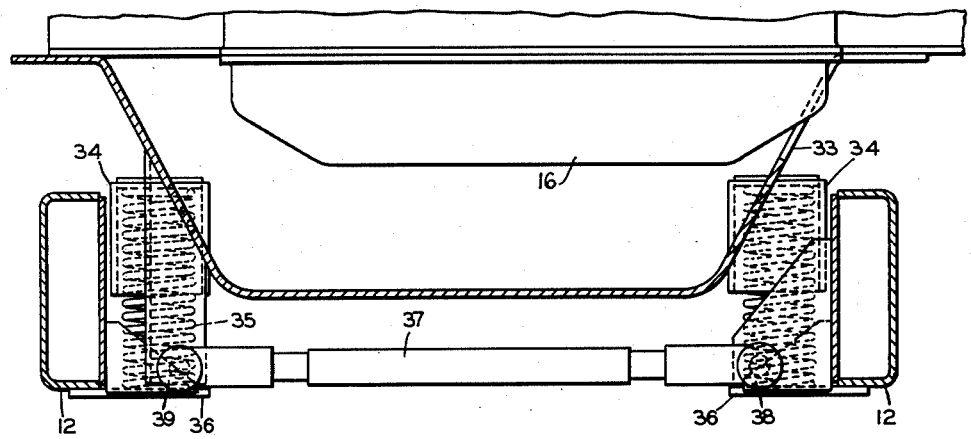
Fig. 4 is a detail sectional view on a larger scale, on the line 4—4, Fig. 2.
Figure 5:
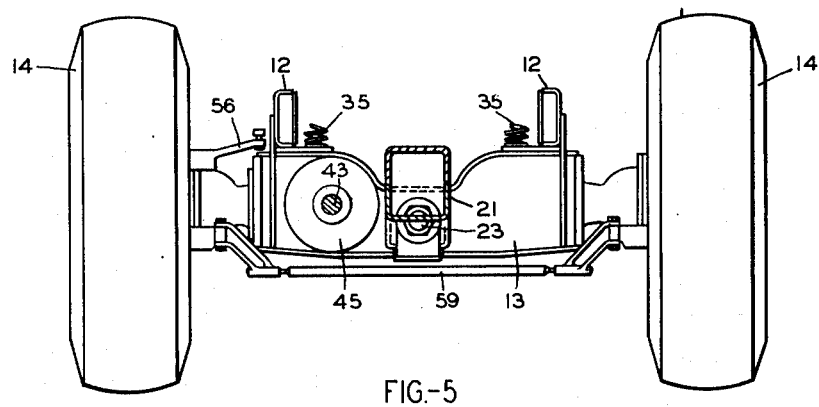
Fig. 5 is a sectional elevation on the line 5—5, Fig. 2.

The cab 15, engine 16 and transmission 17 are all mounted upon a sub-frame marked generally 33, Fig. 4. At the four corners of the sub-frame it is provided with inverted cup-shaped housings 34, each capping, surrounding and resting upon the upper end of a coil spring 35 resting upon a bracket 36 (Fig. 2) secured to the main frame 12. Thus the cab and engine members are yieldingly mounted upon the main power unit frame, so that the truck is easy riding. To permit relative vertical motion between the main and sub-frame members of the power unit, but prevent relative lateral motion and possible escape of one member from the other, I provide several sway braces 37, one extending laterally and two diagonally (Figs. 2 and 4), each pivotally connected at one end, by a ball joint, as at 38, to the main frame and its opposite end, by a similar joint, as at 39, to the sub-frame.

As before stated the truck is provided with four wheel drive. Power is taken off from the change speed mechanism 17, by way of shaft 40 to a gear box 41, mounted upon the frame of the load-carrying unit. From this gear box power is taken off by way of shafts 42 and 43. Shaft 42 drives conventional differential mechanism, indicated at 44, for the rear axle. Shaft 43 operates differential mechanism, indicated at 45, for driving propelling shafts, one for each of the two front wheels. This driving mechanism for the front wheels is disclosed and claimed in my copending application Serial No. 139,947, filed January 21, 1950.

The wheel frame, or a part connected thereto, of course is provided with an operating arm 56 (Fig. 2) actuated by a link 57 connected to the usual steering mechanism, marked generally 58, and the two steering wheels are cross connected, for joint operation, by the usual cross bar or link 59.

The truck as a whole is rugged and durable and may be satisfactorily employed for a variety of purposes. It may be used either for load-carrying purposes, or, usually in reverse gear, for bulldozing operations, and in either case is self-accommodating to rough terrain without the production of harmful torsional strains and stresses. The cab, engine and change speed mechanism are yieldingly mounted so that the vehicle is easy riding, but are so mounted as to prevent side sway or escape from the main frame of the power unit. Four wheel drive makes the vehicle very powerful, the drive mechanism being of such form as to reduce wear and tear and deliver power to the wheels with maximum efficiency.

Other advantages of the invention will be apparent to those skilled in the art.

What I claim is:

1. A power-operated truck, comprising a power unit and a load-carrying unit pivotally connected upon a central longitudinal axis, the load-carrying unit including a two-wheeled rear axle supporting the same, the power unit including a main frame and a two-wheeled front axle supporting said frame, a sub-frame mounted upon the main frame, a cab and an engine and a transmission mechanism supported by the sub-frame, said mounting of said sub-frame upon said main frame providing motion of said engine and transmission and cab and sub-frame, as a unit, relative to said main frame, resilient means connecting and supporting the sub-frame on the main frame, and means for permitting relative vertical motion but preventing relative lateral motion between the main and sub-frames, comprising three links, two extending diagonally to form a V-shape and one extending laterally from one of the divergent ends of the V substantially to a point longitudinally disposed with respect to the junction of the V, each link pivotally connected at its opposite ends to the main and sub-frames respectively, said pivotal connections to the sub-frame lying along a longitudinal axis parallel to the axis of said pivotal connections to the main frame.

2. A power-operated truck as set forth in claim 1 wherein said resilient means comprises at least four spaced springs, one adjacent each corner of the sub-frame and each spring lying along one of the longitudinal pivotal connection axes.

3. A power operated truck, comprising a power unit and a load-carrying unit pivotally connected upon a central longitudinal axis, the load-carrying unit including a two-wheeled rear axle supporting the same, the power unit including a main frame and a two-wheeled front axle supporting said frame, a sub-frame resiliently mounted upon the main frame, a cab and an engine and a transmission mechanism supported by the sub-frame, said mounting of said sub-frame upon said main frame providing motion of said engine and transmission and cab and sub-frame, as a unit, relative to said main frame, said sub-frame substantially filling the space between opposite sides of said main frame, and means for permitting relative vertical motion but preventing relative lateral motion between the main and sub-frame, comprising one laterally extending link and two diagonally extending links diverging from closely adjacent points, each of said links being pivotally connected to said main frame near one side of the vehicle and pivotally connected to said sub-frame near the other side of said vehicle.

4. A power operated truck, comprising a power unit and a load-carrying unit pivotally connected upon a central longitudinal axis, the load-carrying unit including a two-wheeled rear axle supporting the same, the power unit including a main frame and a two-wheeled front axle supporting said frame, a sub-frame resiliently mounted upon the main frame, a cab and an engine and a transmission mechanism supported by the sub-frame, said mounting of said sub-frame upon said main frame providing motion of said engine and transmission and cab and sub-frame, as a unit, relative to said main frame, and means for permitting relative vertical motion but preventing relative lateral motion between the main and sub-frames, comprising three links, two extending diagonally and one laterally, each pivotally connected at its opposite ends to the main and sub-frame respectively.

WALTER F. DOUBLE.

REFERENCES CITED

The following references are of record in the file of this patent:

UNITED STATES PATENTS

| Number | Name | Date |
|---|---|---|
| 224,531 | Heikes | Feb. 17, 1880 |
| 904,793 | Maxwell | Nov. 24, 1908 |
| 1,106,675 | Pezzetti | Aug. 11, 1914 |
| 1,334,158 | McGill | Mar. 16, 1920 |
| 1,337,501 | Arluskes | Apr. 20, 1920 |
| 1,351,084 | Winther | Aug. 31, 1920 |
| 1,371,859 | Carpenter | Mar. 15, 1921 |
| 1,503,658 | MacDonald | Aug. 5, 1924 |
| 1,648,875 | Griese | Nov. 8, 1927 |
| 1,690,205 | Parrett | Nov. 6, 1928 |
| 1,829,251 | Whittington et al. | Oct. 27, 1931 |
| 1,852,618 | Le Tourneau | Apr. 5, 1932 |
| 1,925,296 | Barrett | Sept. 5, 1933 |
| 2,013,599 | Butler | Sept. 3, 1935 |
| 2,107,606 | Gemmer | Feb. 8, 1938 |
| 2,205,999 | Bartlett et al. | June 25, 1940 |
| 2,209,457 | Hare | July 20, 1940 |
| 2,212,193 | Keese | Aug. 20, 1940 |
| 2,222,698 | Armington | Nov. 26, 1940 |
| 2,348,801 | French et al. | May 16, 1944 |
| 2,366,166 | Willock | Jan. 2, 1945 |
| 2,368,202 | Clark | Jan. 30, 1945 |
| 2,400,218 | Akers | May 14, 1946 |

FOREIGN PATENTS

| Number | Country | Date |
|---|---|---|
| 539,772 | Great Britain | Sept. 23, 1941 |